United States Patent [19]
Brown et al.

[11] Patent Number: 5,341,551
[45] Date of Patent: Aug. 30, 1994

[54] UNIVERSAL TURRET SYSTEM FOR QUICK-CHANGE LATHE TOOLING

[75] Inventors: Charles R. Brown, Raleigh; Robert J. Robertson, Zebulon; Dandridge W. Buckley, Jr.; Frank A. Milchuck, both of Raleigh, all of N.C.

[73] Assignee: Kennametal Inc., Latrobe, Pa.

[21] Appl. No.: 884,600

[22] Filed: May 15, 1992

[51] Int. Cl.⁵ .............................................. B23B 29/32
[52] U.S. Cl. ............................................ 29/40; 29/39; 29/27 C
[58] Field of Search ................ 29/39, 40, 27 R, 27 C; 82/121

[56] References Cited
U.S. PATENT DOCUMENTS

| | | | |
|---|---|---|---|
| 2,534,333 | 12/1950 | Wyrick | 29/39 X |
| 4,057,881 | 11/1977 | Stephens | 29/40 X |
| 4,706,351 | 11/1987 | Chuang | 29/39 |
| 5,065,492 | 11/1991 | Von Haas et al. | 29/40 X |

Primary Examiner—Z. R. Bilinsky
Attorney, Agent, or Firm—James G. Porcelli

[57] ABSTRACT

A universal turret system is provided and includes the capability of accommodating a wide range of multi-class tooling including manual tools, manual quick-change tools, semi or fully automatic tooling, and live or driven tooling. The universal turret system includes a plurality of tool adapters with each adapter being mountable at any station on the turret disk and with each tool adapter being designed to receive or drive a specific tool from the multi-tool class.

7 Claims, 10 Drawing Sheets

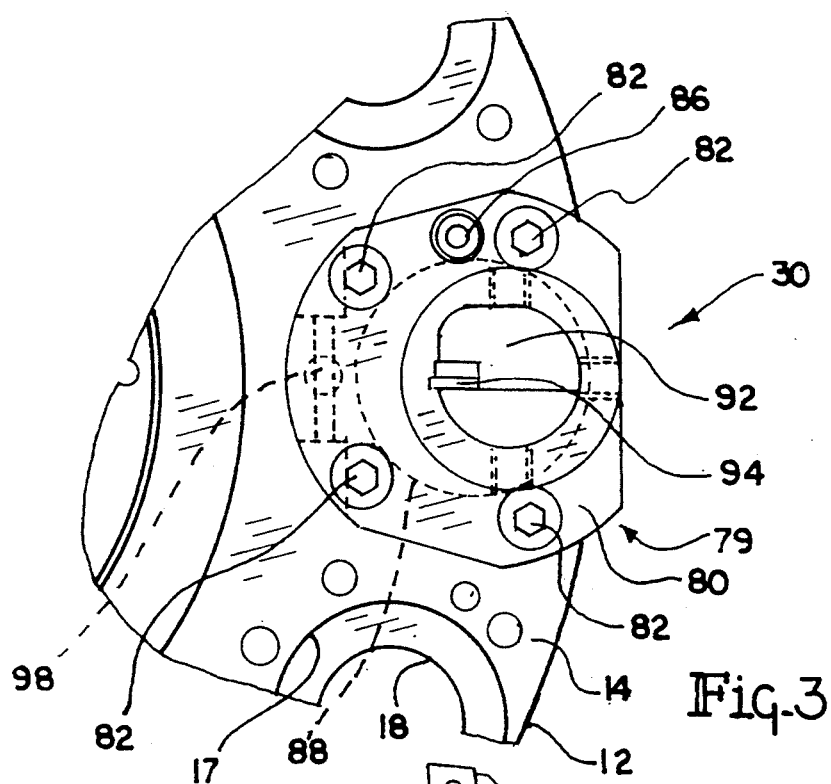
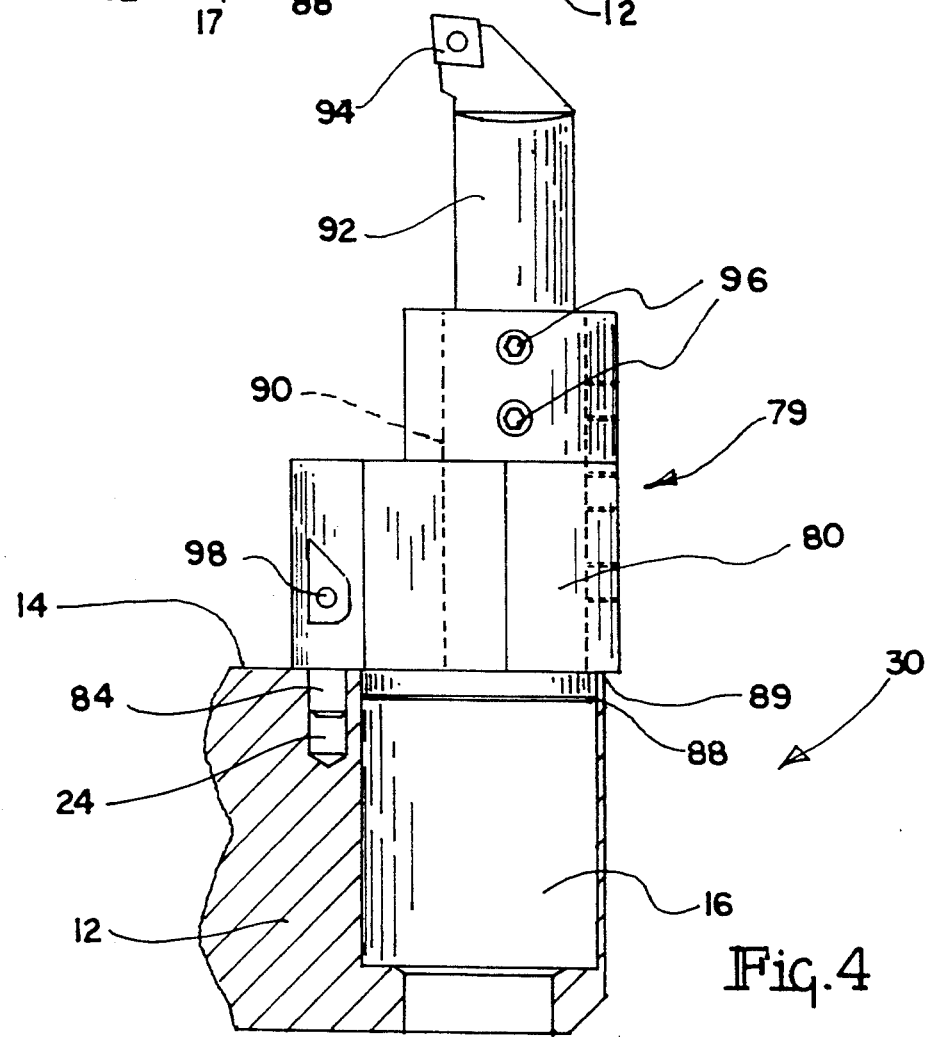

UNIVERSAL TURRET SYSTEM FOR QUICK-CHANGE LATHE TOOLING

FIELD OF INVENTION

The present invention relates to machine tools and more particularly to turret systems having quick-change lathe tooling.

BACKGROUND OF THE INVENTION

In the past, turret disk systems have been designed to generally accommodate limited types or classes of tooling. For example, it is common to find turret systems that will accommodate conventional or manual tooling such as a shank-type tool holder but incapable of accommodating semi or fully automatic tools or a live or driven tools. The result of this is that tool builders and end users find themselves locked into a position where they have no flexibility in implementing a standardized flexible quick-change tooling system. This point is illustrated by the fact that an end user can purchase a turret system that has the limited capability of accommodating only one or two classes of quick-change tooling and which is unable to accommodate more advanced and sophisticated quick-change tooling such as those classes of tools typically referred to as semi or fully automatic quick-change tooling and live or driven tooling. In time, the same end user will often find himself in a position where it is desirable to utilize these more advanced and sophisticated quick-change tools but because of the design and limited flexibility of the turret system, the end user is placed in a position where he has but one alternative, that alternative being to purchase a new turret system designed specifically to accommodate the desired class of tooling.

Moreover, conventional turret systems have not been adapted to enhance machine and operator efficiency, reduce cost or improve productivity. For example, in conventional turret disk systems, it is not unusual to find efficiency as low as twenty percent with the operator spending as much as sixty percent of his time setting up the turret system and with the remaining twenty percent being divided between idle and stop time.

Thus, there is a need for a turret disk system which facilitates tools standardization and tool management by enhancing machine flexibility. In this same regard, there is a need for a turret disk system that will accommodate a wide range of tool classes including manual tools, manual quick-change tools, semi or fully automatic quick-change tools, and live or driven tools.

SUMMARY AND OBJECTS OF THE INVENTION

The present invention entails a turret disk system that overcomes the drawbacks and shortcomings of conventional turret disk systems and their associated tooling of the prior art. In particular, the present turret disk system comprises a turret disk and a series of tool adapters that will accommodate a full range of tooling including four specific classes of tools: (1) conventional manual tools, (2) manual quick-change tools, (3) semi or fully automatic quick-change tools, and (4) live or driven tools.

The universal turret disk system of the present invention includes a turret disk having a series of through cavities formed about the periphery of the turret disk. A series of tool adapters are also provided with respective adapters having a like bolt hole mounting pattern and adapted to be mounted adjacent any through cavity formed on the turret disk. Each tool adapter is designed to accept or drive a specific tool or class of tool. Thus, the turret disk system of the present invention has the capability of handling tools from all four of the above tool classes and it is important to appreciate that the various tools from the four tool classes can be mounted at any selected location on the turret disk.

It is therefore a principal object of the present invention to provide a turret disk system that will accommodate a wide range of tools from multi-classes including conventional manual tools, manual quick-change tools, semi or fully automatic quick-change tools, and live or driven tools.

A further object of the present invention resides in the provision of a unique universal turret disk system which facilitates tool standardization and tool management by enhancing machine flexibility.

A further object of the present invention resides in the provision of a turret disk system of the character referred to above wherein all tooling is interchangeable from machine to machine, model to model, and position to position for turning, boring or rotating operations on lathes or machine centers in manual/modular, semi-automatic or fully automatic applications.

Still a further object of the present invention resides in the provision of a universal turret disk system that offers machine tool builders and end users alternative tooling choices and problem solving options as they move from conventional tooling to manual, semi-automatic and fully automatic quick-change systems.

It is also an object of the present invention to provide a universal turret disk system of the character referred to above that reduces tool change and setup time.

It is also an object of the present invention to provide a turret disk system of the character referred to above that minimizes manual involvement.

Another object of the present invention is to provide a universal turret disk system of the character referred to above that is provided with the capability of directing coolant through the turret disk itself and therefrom into and through any tool adapter or tool utilized.

Still a further object of the present invention resides in the provision of a universal turret disk system of the character referred to above that provides flexible tooling positions for all boring, turning or any random combination of turning or boring.

Still a further object of the present invention resides in the provision of a turret disk system of the character referred to above that reduces tool costs, reduces tooling inventory, and yields consistent performance.

Other objects and advantages of the present invention will become apparent and obvious from a study of the following description and the accompanying drawings which are merely illustrative of such invention.

BRIEF DESCRIPTION OF THE DRAWINGS

FIG. 3 is a fragmentary front elevational view of a conventional manual ID tool mounted on the turret disk of the present invention.

FIG. 4 is a fragmentary transverse sectional view through the turret disk showing the conventional manual ID tool of FIG. 3 mounted within the turret disk.

DETAILED DESCRIPTION OF THE INVENTION

Figure 1:
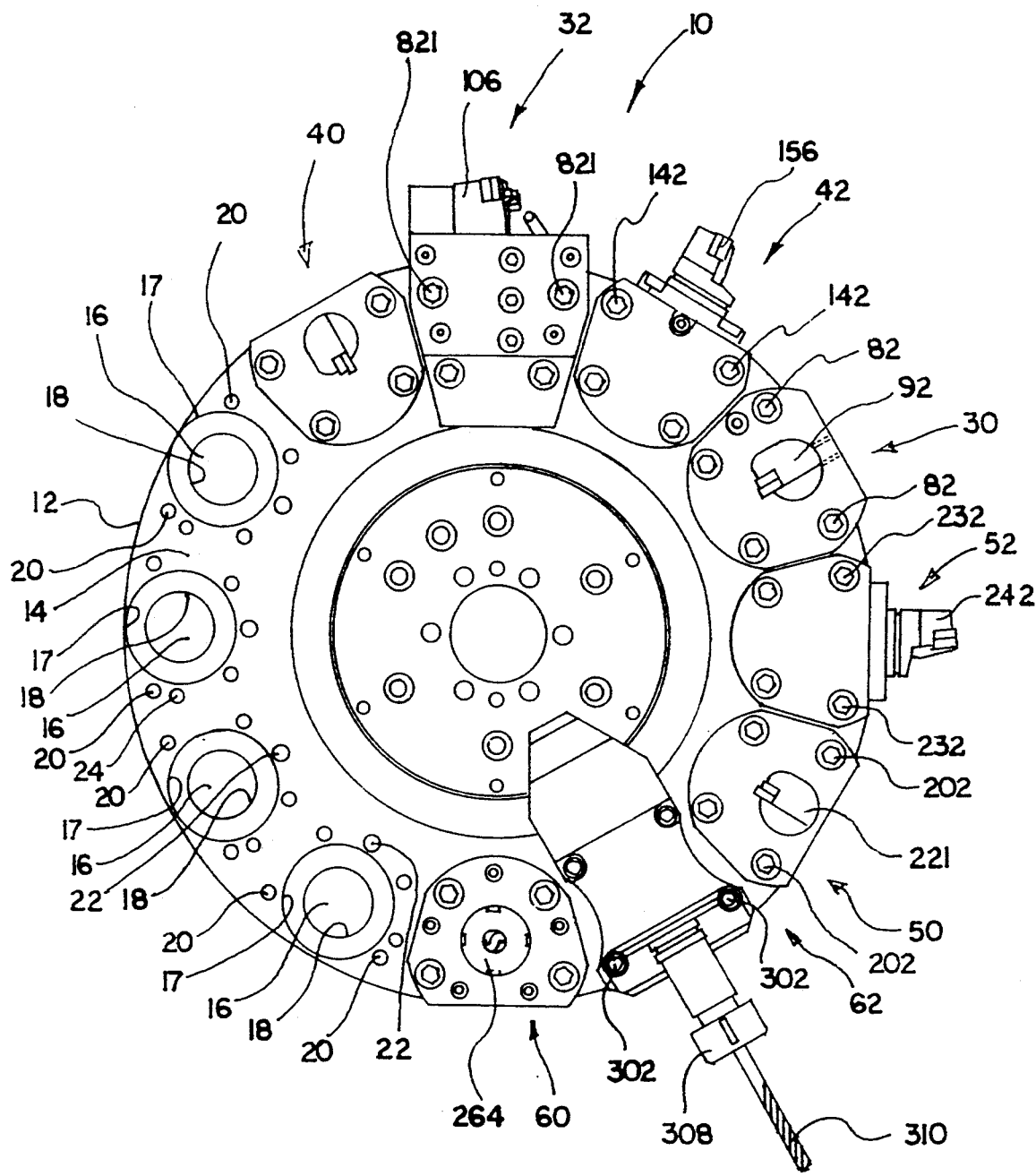
FIG. 1 is a front elevational view of the turret disk system of the present invention.
Figure 2:
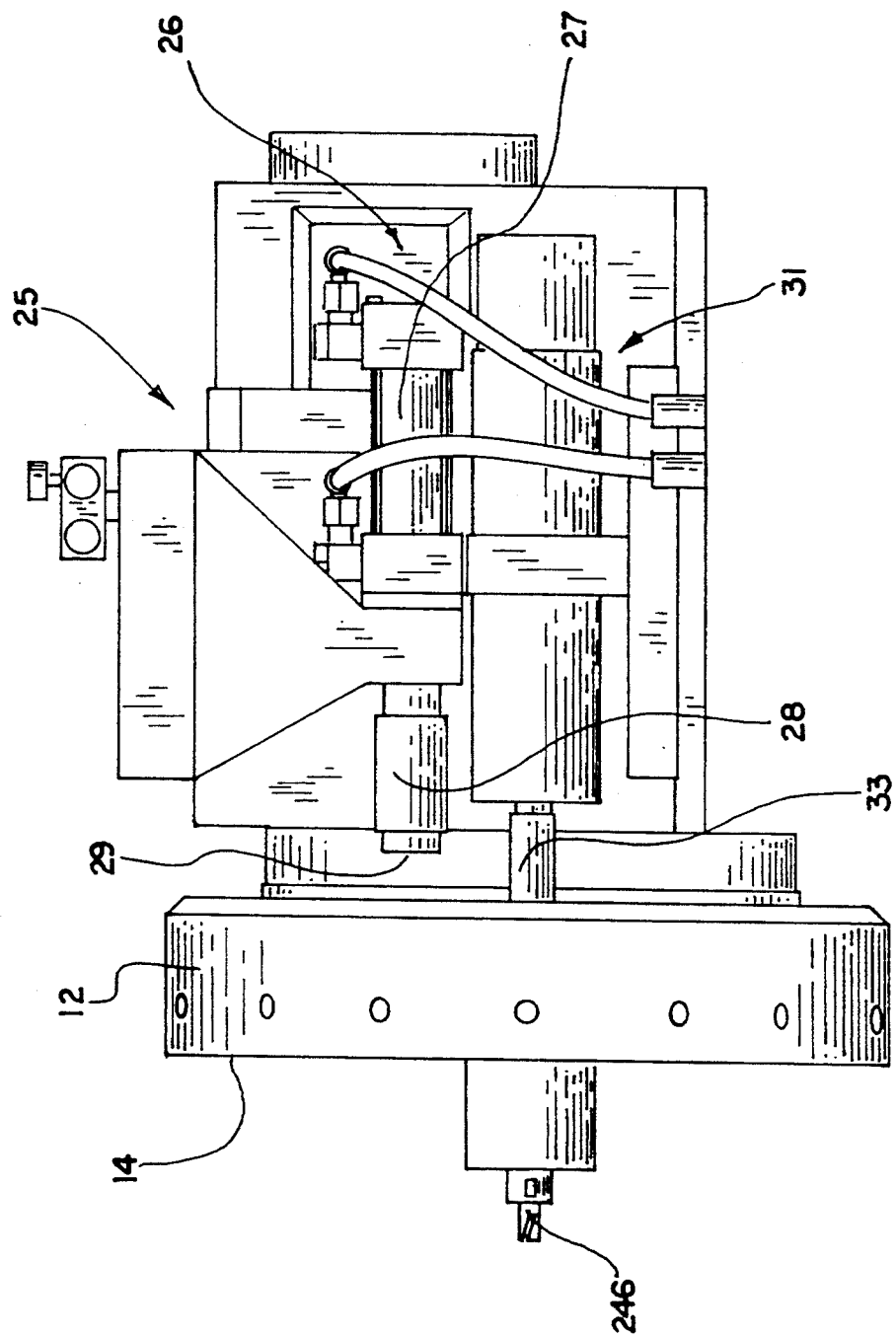
FIG. 2 is a side elevational view of the turret disk system of the present invention.

With further reference to the drawings, particularly FIGS. 1 and 2, the universal turret disk system of the present invention is shown therein and indicated generally by the numeral 10.

Viewing the turret disk system 10 in more detail it is seen that the same includes a turret disk 12 having a front mounting face 14. Formed in and through the face 14 of the turret is a series of through cavities 16, each cavity 16 including a front opening 17 and a rear opening 18. Formed about each through cavity 16 is a four bolt hole pattern with each bolt hole being threaded and referred to by the numeral 20. It is noted that the bolt hole pattern around each cavity is identical. As will be appreciated from subsequent portions of this disclosure, this enables respective tool adapters to be mounted about any through cavity 16 formed within the turret disk 12.

Also formed within the face 14 of turret disk 12 about each through cavity 16 is a locator port 22 for accepting a locating pin that will be subsequently described. In addition about each through cavity 16 there is provided an input coolant port 24 that is effective to communicate with a tool adapter, to be later described, for transferring coolant from the turret disk 12 to the adapter and particularly to a tool being supported within the adapter.

As seen in FIG. 2, the turret disk system 10 includes an indexer unit 25 that rotatively indexes the entire turret disk 12. Details of the indexer unit 25 are not described in detail because such is not per se material to the present invention and because such devices are well-known and appreciated by those skilled in the machine tool art.

In subsequent portions of this disclosure there will be a discussion of semi or fully automatic quick-change tools. These tools are typically unlocked by some external mechanical means. To achieve this, the universal turret disk system 10 of the present invention is provided with a semi or fully automatic quick-change tool unlock actuator indicated generally by the numeral 26. As viewed in FIG. 2, the actuator 26 includes a double acting piston assembly 27 that includes a shaft 28 extending therefrom. Shaft 28 includes an end portion 29 that engages and actuates the semi or fully automatic quick-change tool so as to unlock the same depending on the particular system being used. As seen in FIG. 2, the piston assembly 27 is operative to actuate shaft 28 which results in the shaft end 29 being extended right to left into the rear opening 18 of the through cavity 16. As the shaft end 29 moves towards or through the rear opening 18 it is designed to engage the semi or fully automatic quick-change tool within that particular cavity and typically cause the same to be transformed from a locked to an unlocked state.

Disposed below the actuator 26 is a live tool drive unit indicated generally by the numeral 31. Drive unit 31 can be powered by any suitable source but in the present application it is contemplated that the same would be powered by an electric motor. In any event, the drive unit 31 includes an output drive shaft 33 that is particularly stationed and aligned to line up with the center opening of the respective cavities 16 as the turret disk 12 is advanced from point to point or stationed to station. As will be appreciated from subsequent portions of this disclosure, the drive shaft 33 is designed and adapted to engage a drive shaft assembly associated with a live or driven tool to be subsequently described.

The universal turret disk system of the present invention is designed to accept a wide range of tools. In particular, the present turret disk system 10 is designed to even accommodate (1) conventional manual tools, (2) manual quick-change tools, (3) semi or fully automatic quick change tools and (4) live or driven tools.

Figure 5:
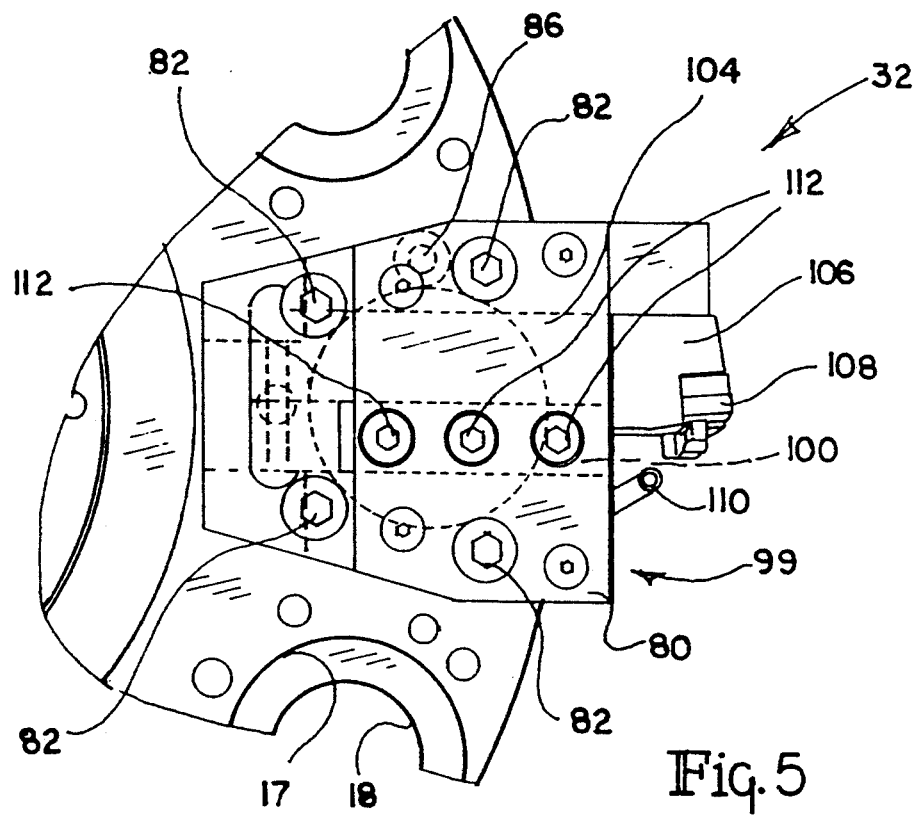
FIG. 5 is a fragmentary front elevational view of a conventional manual OD tool mounted on the turret disk of the present invention.
Figure 6:
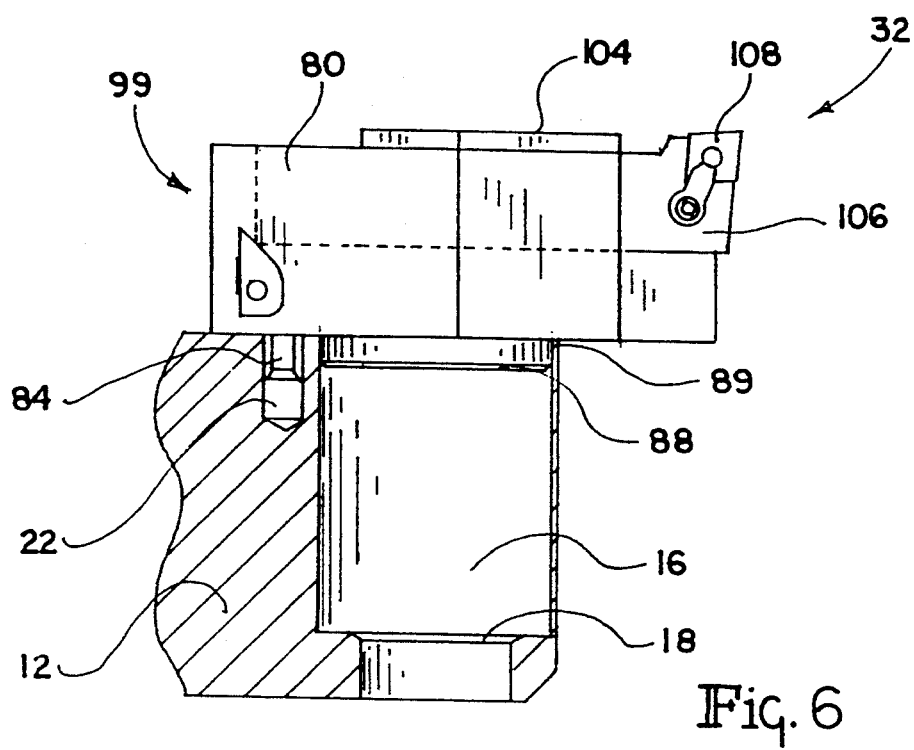
FIG. 6 is a fragmentary transverse sectional view through the turret disk showing the conventional manual OD tool of FIG. 5 mounted within the turret disk.

Turning to the drawings, and particularly FIG. 1 and the individual drawings that follow, the turret system 10 as shown in FIGS. 3 and 4, is designed to accept a conventional manual ID tool 30. In FIGS. 5 and 6, there is shown a conventional manual OD tool 32 that is mounted to the turret disk 12.

Figure 7:
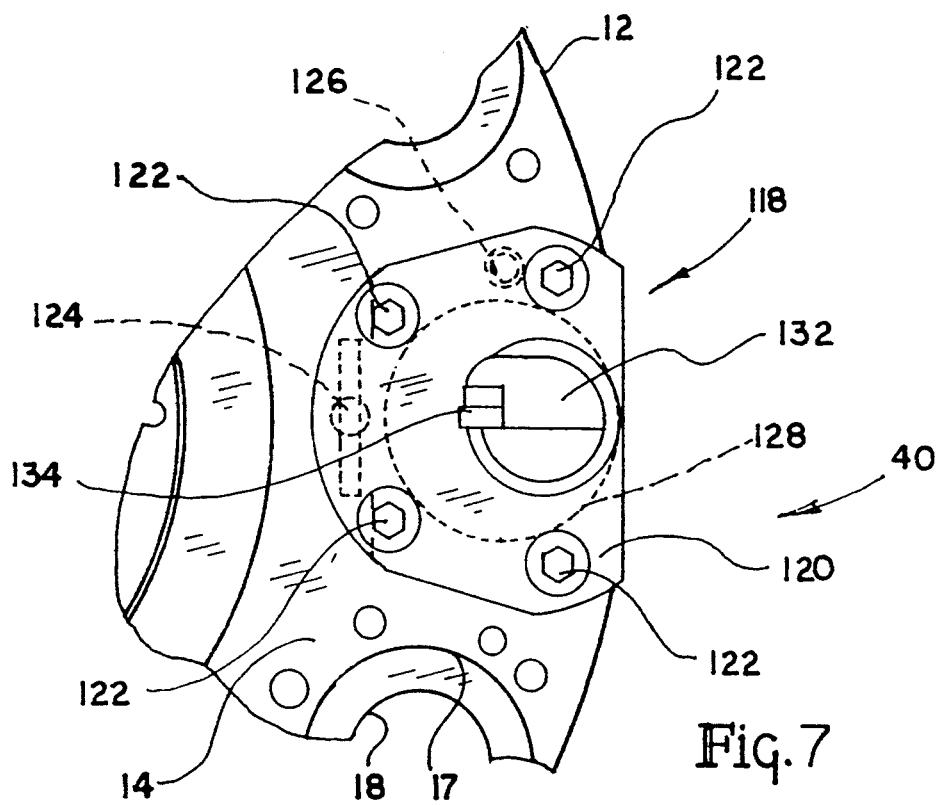
FIG. 7 is a fragmentary front elevational view of a manual quick-change ID tool mounted on the turret disk of the present invention.
Figure 8:
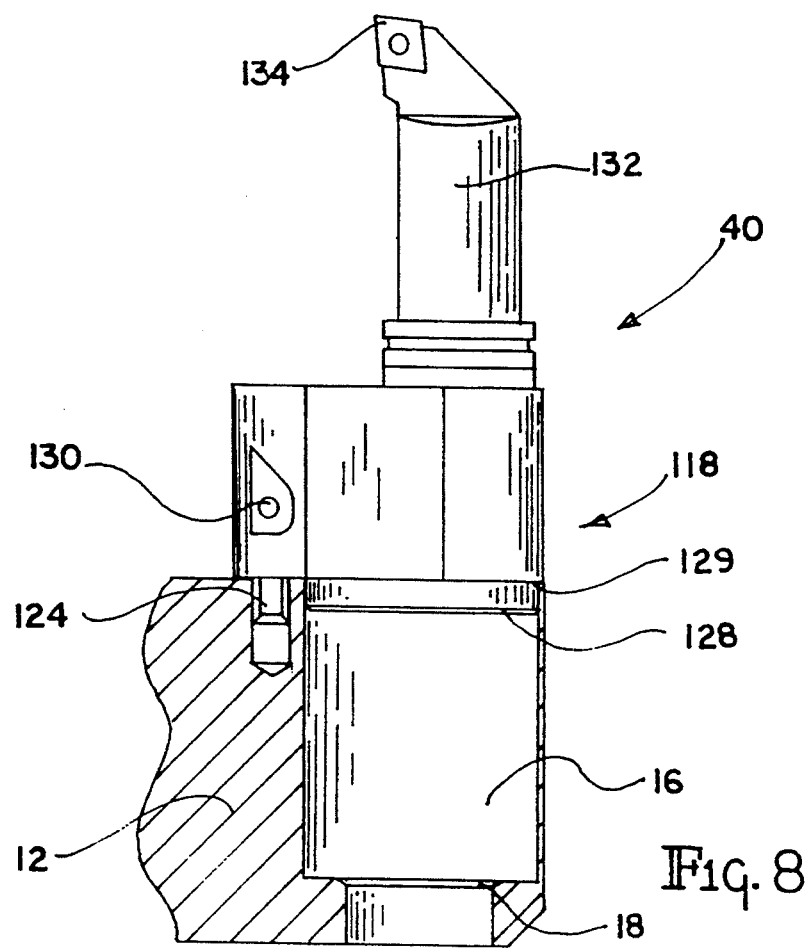
FIG. 8 is a fragmentary transverse sectional view through the turret disk showing the manual quick-change ID tool of FIG. 7 mounted within the turret disk.

Now turning to the class of manual quick-change tools, it is seen that the turret disk system 10 of the present invention is designed to accept a manual quick-change ID tool indicated generally by the numeral 40 and particularly shown in FIGS. 7 and 8. In this same regard, in FIGS. 9 and 10, there is shown a manual quick-change OD tool 42 mounted to the turret disk 12.

Figure 11:
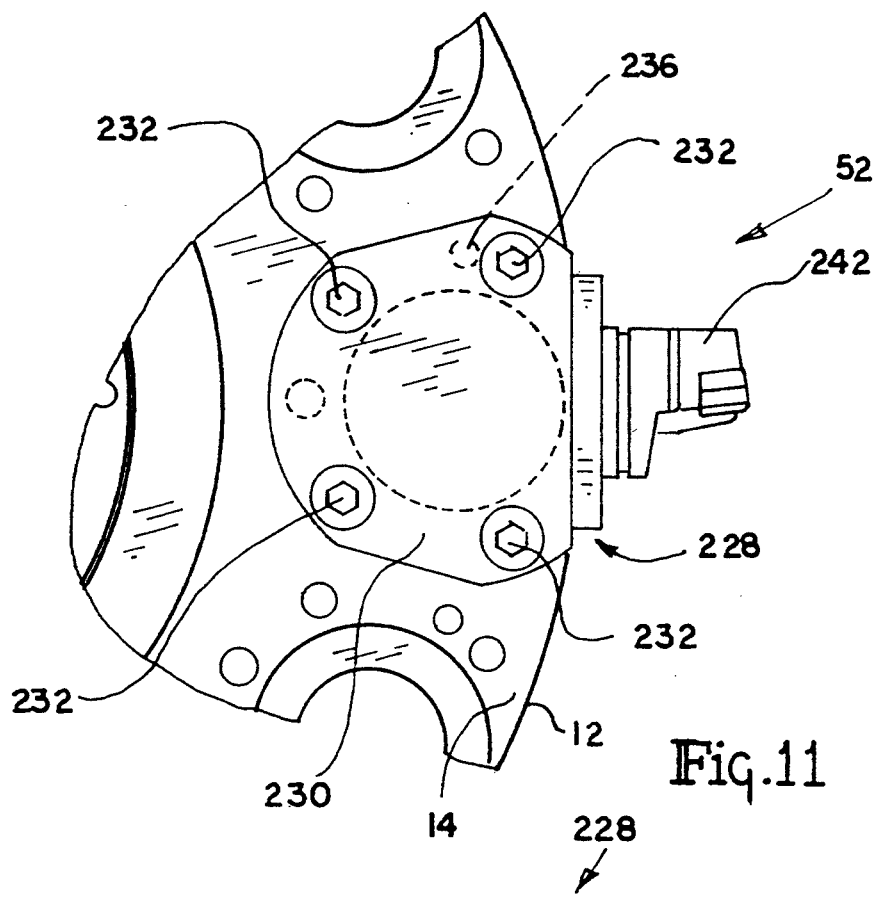
FIG. 11 is a fragmentary front elevational view of a semi or fully automatic quick-change OD tool mounted on the turret disk of the present invention.
Figure 12:
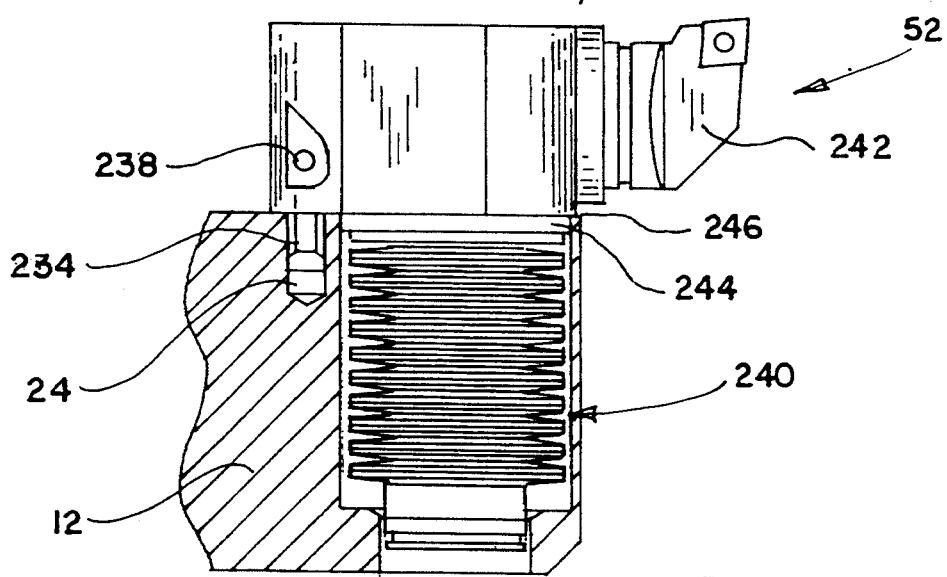
FIG. 12 is a fragmentary transverse sectional view through the turret disk showing the semi or fully automatic quick-change OD tool of FIG. 10 mounted within the turret disk.

In FIGS. 11 and 12, there is shown a semi or fully automatic quick-change OD tool 52 that is mounted to the turret disk 12. In like manner, in FIGS. 13 and 14, a semi or fully automatic quick-change ID tool 50 is mounted to the turret disk 12.

Figure 15:
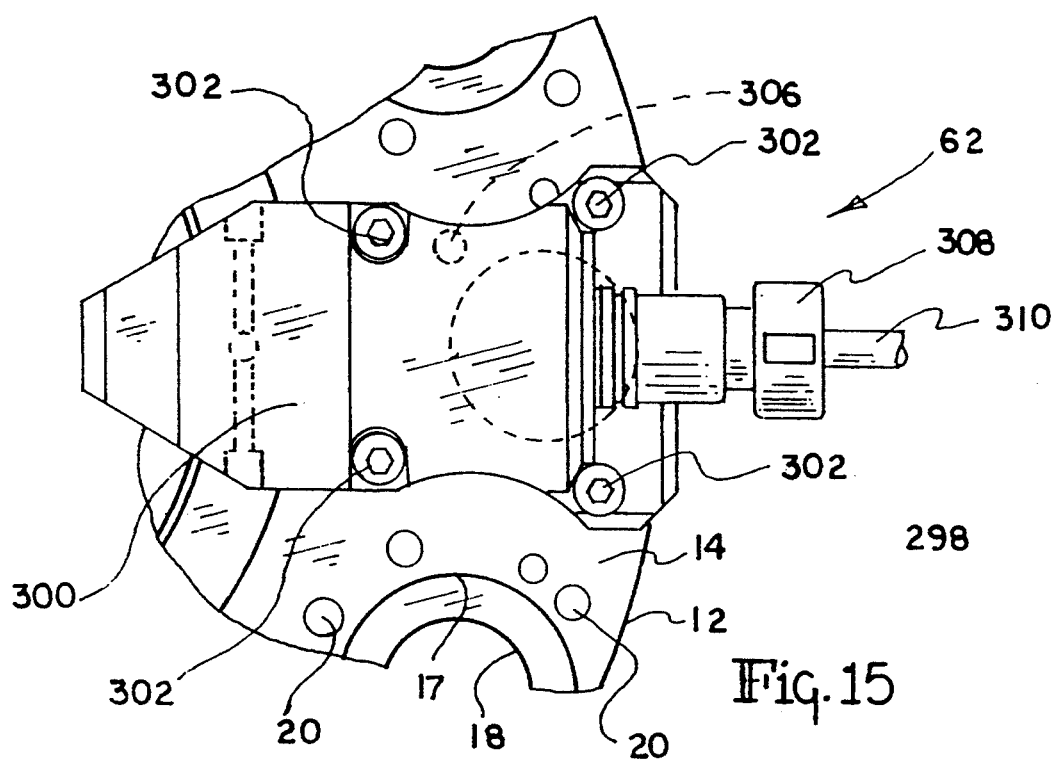
FIG. 15 is a fragmentary front elevational view of a live of rotating quick-change OD tool mounted on the turret disk of the present invention.
Figure 16:
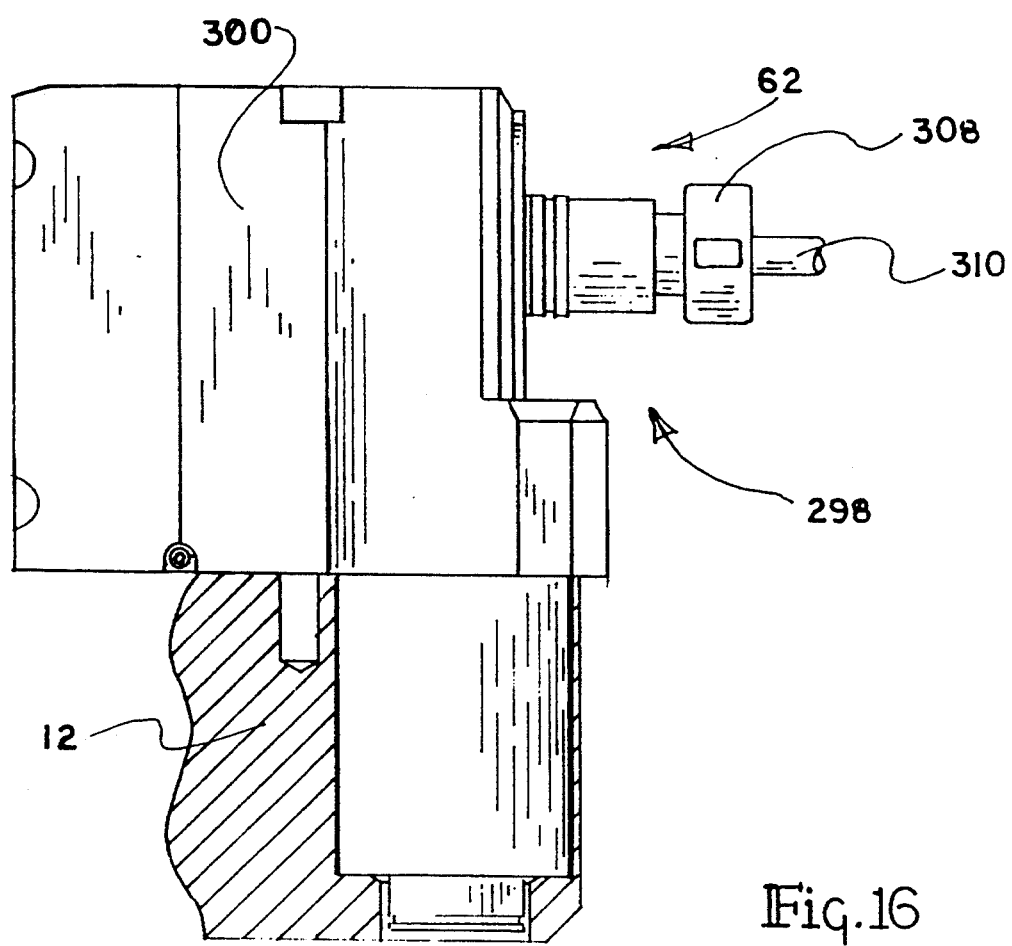
FIG. 16 is a fragmentary side elevational view of the rotating or live OD tool of FIG. 15 mounted on the turret disk.
Figure 17:
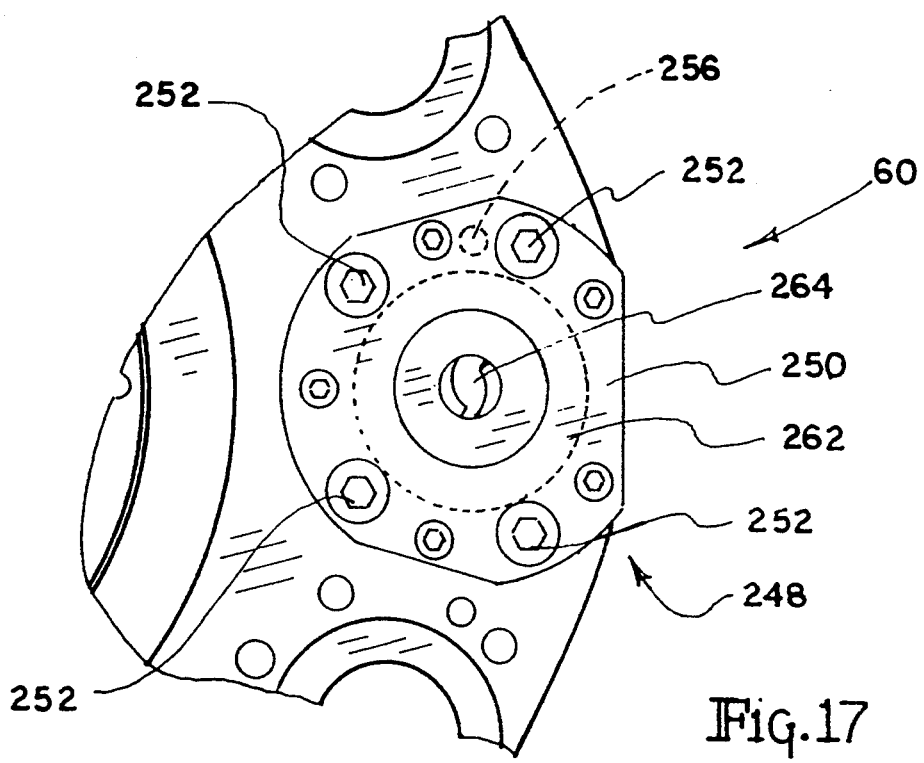
FIG. 17 is a fragmentary front elevational view of a live or rotating quick-change ID tool mounted on the turret disk of the present invention.
Figure 18:
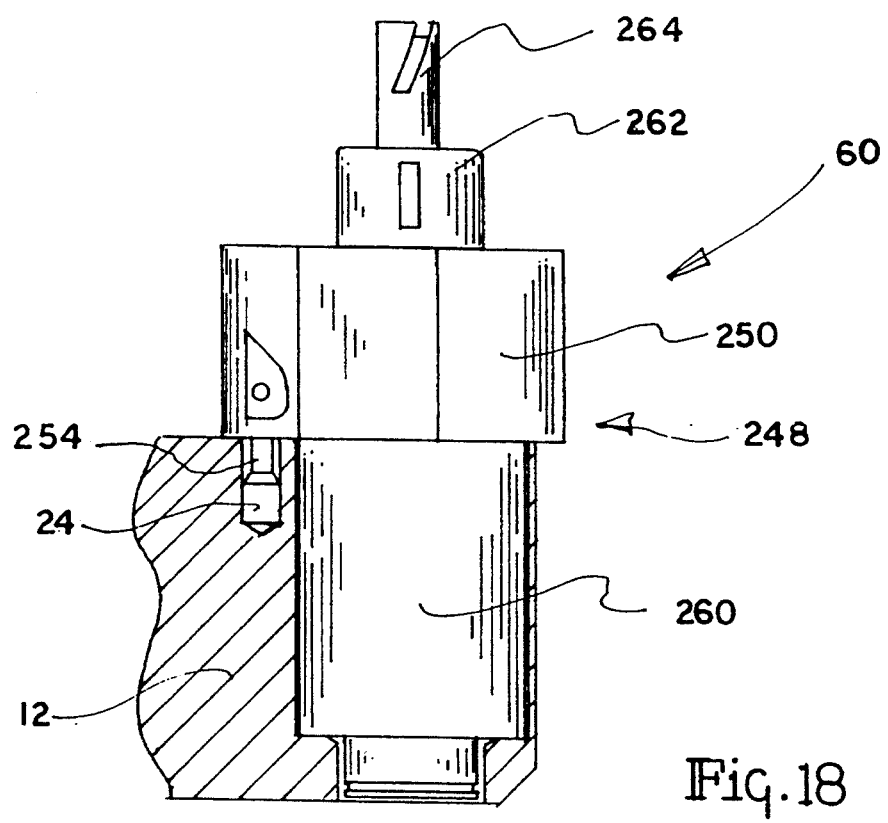
FIG. 18 is a fragmentary side elevational view of the rotating or live OD tool of FIG. 17 mounted on the turret disk.

Viewing FIGS. 15 and 16, there is shown a live or rotating OD tool indicated generally by the numeral 62. Shown in FIGS. 17 and 18, is a live or rotating ID tool indicated generally by the numeral 60.

A detailed discussion of each tool class and the specific tools shown in FIGS. 3–18 will not be dealt with herein in detail because the individual tools themselves are not per se material to the present invention and are known and appreciated in the machine tool industry. But for a more complete and unified understanding of the universal turret disk system 10 of the present invention and the manner in which it accommodates a wide range of tools, a brief description of the tools shown in FIGS. 3–18 will be forthcoming.

First, turning to FIGS. 3–6, there is shown therein two types of conventional manual tooling. First, in FIGS. 3 and 4, there is shown a conventional manual tool indicated generally by the numeral 30. The particular tool shown is a boring bar tool that is adapted and designed for ID applications. Viewing the conventional manual boring bar tool 30 in more detail, it is seen that the same includes a tool adapter indicated generally by the numeral 79. Adapter 79 comprises a housing structure 80 having a series of four threaded bolt hole openings formed therein. Like other tool adapters to be discussed herein, the conventional manual tool adapter 79 (FIG. 3) includes a four bolt hole pattern identical to the hole pattern formed about each through cavity 16 of the turret disk 12. To secure tool adapter 79 to the turret face 14, a series of four cap screws 82 is provided. Cap screws 82 are adapted to be screwed into the threaded openings 20 that form the four hole bolt pattern around each through cavity 16.

Extending from the back or rear of the tool adapter 79 is a locator pin 84 that is designed to mate with anyone of the locator ports 22 formed around the respective through cavities 16. The housing structure 80 of conventional manual tool adapter 79 is provided with an internal coolant port 86 that is designed to align with anyone of the coolant ports 24 formed adjacent respective through cavities 16.

Housing 80 of the adapter 79 includes a rear pilot 88 that is adapted to precisely fit within the front opening 17 of the respective through cavities 16. In particular, the outside diameter of the pilot 88 is slightly less of the front opening 17 of cavities 16. As seen in FIG. 4, adjacent pilot 88 there is provided an outside abutting edge 89 or shoulder that fits flush against the front face 14 of the turret disk 12. This assures a snug and secure fit of the tool adapter 79 about the turret face 14. This basic flange and shoulder arrangement is repeated throughout in each of the tool adapters to be described.

Continuing to refer to FIGS. 3 and 4 and the tool adapter 79 it is seen that the same includes a bore 90 for receiving a boring bar 92. Boring bar 92 includes a tool insert 94. Set screws 96 are utilized to secure the boring bar 92 within the bore 90 of tool adapter 79. Tool adapter 79 includes a conventional radial adjustment screw for slightly adjusting the tool adapter 79 about its central axis.

It is appreciated that the tool adapter 79 can be mounted to any one of the twelve tool stations or cavities 16 formed about the turret face 14 of the turret disk 12.

Now turning to FIGS. 5 and 6, there is shown therein a conventional manual tool of the OD type. Tool 32 includes a tool adapter indicated generally by the numeral 99. Tool adapter 99 includes a housing structure 80' that includes a bolt hole pattern that is identical to the bolt hole pattern 20 formed about the turret face 14. In particular, the tool adapter 99 includes a series of four caps screws 82' that are designed to secure the tool adapter 99 to the turret face 14. Tool adapter also includes a locating pin 84' that extends from the rear of tool adapter 99. Also the tool adapter 99 shown in FIGS. 5 and 6 includes an internal coolant port 86' that aligns with any of the coolant ports 22 formed in the turret face 14. To assure the proper placement of the tool adapter 99 about the turret face 14, the tool adapter 99 includes a rear pilot 88' and an adjacent abutting shoulder 89'. This, like the case with the conventional manual tool 30 of FIGS. 3 and 4, this assures that the tool adapter 99 is properly positioned about a respective through cavity 16 formed within the turret disk 12.

Tool adapter 99 includes a wedge 100 that is disposed behind a front plate 104. A tool holder shank 106 is held within the tool adapter 99 and includes a cutting insert 108 secured to the outer remote end portion thereof. A discharge coolant port 110 extends from the tool adapter 99 and is operative to direct coolant therefrom. In order to bind the tool holder shank 106 within the tool adapter 99, there is provided a series of wedge actuating screws 112 that function to move the wedge 100 back and forth into engagement with the shank 106 so as to secure the same within the tool adapter 99. As with the case with the conventional manual tool 30 described above, the tool adapter 99 gives this particular tool the capability of being mounted at any work station around the turret face 14.

Now turning to FIGS. 7 and 8, there is shown therein a manual quick-change ID tool indicated generally by the numeral 40. Quick-change ID tool 40 includes a tool adapter indicated generally by the numeral 118. Tool adapter 118 includes a housing structure 120 that is provided with a series of four cap screws 122. In addition about the rear side of housing 120 there is provided a locating pin 124 that projects therefrom and is engaged within a respective locating port 22 formed on the turret disk face 14. In addition, tool adapter 118 includes an internal coolant port 126 that is adapted to communicate or align with a respective coolant port 24 formed in the turret face 14.

A pilot 128 is formed about the rear of tool adapter 118 and designed for fitting into the front opening 17 of the respective through cavities 16. Disposed adjacent pilot 128 is an abutting shoulder portion 129 that cooperates with pilot 128 to position tool adapter 118 about a respective cavity 16. As is provided with the tool adapters disclosed throughout this disclosure, there is provided a radial adjustment screw 130 that extends into the housing of the tool adapter 118 and functions to radially adjust the tool adapter.

The manual quick-change ID tool 40 shown in FIGS. 7 and 8 is designed to receive and hold a boring bar indicated by the numeral 132 which includes an outer cutting insert 134. The manual quick-change tool 40 of FIGS. 4 and 5 is provided with a conventional "KM" clamping mechanism of the type employed by the manual quick-change "KM" tooling manufactured and sold by Kennametal Inc. of Latrobe, Pa. Such clamping mechanisms are commercially available and widely used throughout the machine tool industry. But again as with the case of the tools described herein before, the manual quick-change ID tool 40 of FIGS. 7 and 8 is designed such that it can be mounted at any work station around the turret face 14 because the tool adapter 118 is designed such that it can be conveniently mounted adjacent any one of the cavities 16 formed in the turret face.

Figure 9:
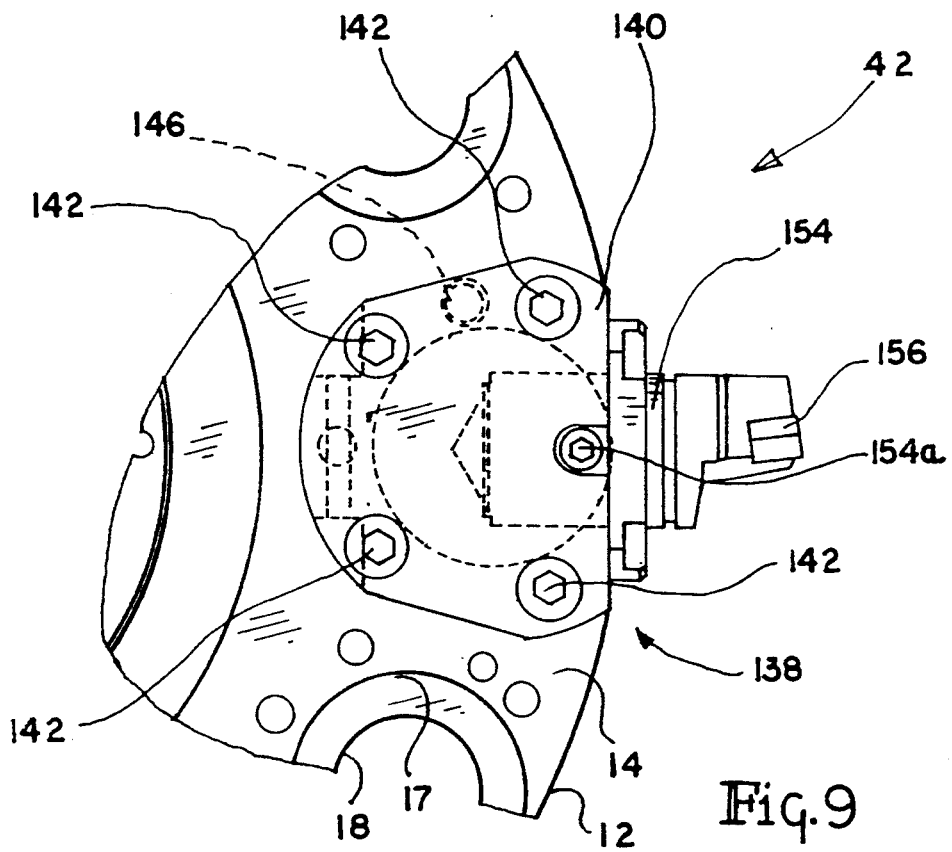
FIG. 9 is a fragmentary front elevational view of a manual quick-change OD tool mounted on the turret disk of the present invention.
Figure 10:
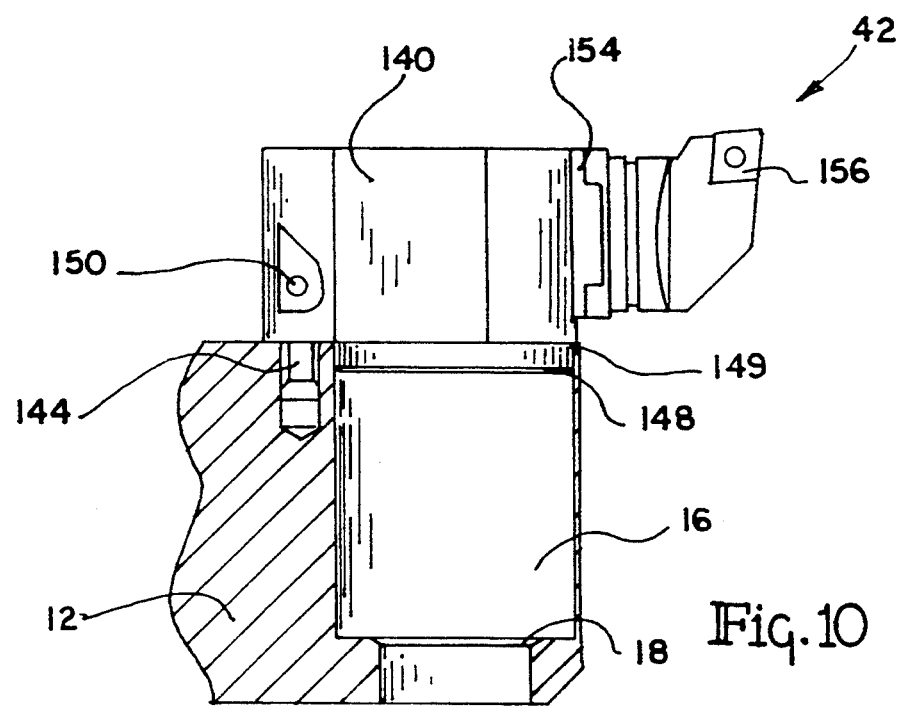
FIG. 10 is a fragmentary transverse sectional view through the turret disk showing the manual quick-change OD tool of FIG. 9 mounted within the turret disk.

Turning now to FIGS. 9 and 10, there is shown therein another manual quick-change tool which in this case is an OD type tool and is indicated generally by the numeral 42. Again, this manual quick-change OD tool 42 includes a tool adapter 138. Tool adapter 138 includes a housing and a like group of four cap screws 142. Locator pin 144 projects from the rear of the tool adapter. An internal coolant port 146 is also formed in the tool adapter and adapted to align with the coolant port 24 formed in the turret disk face 14. In the same fashion as already described, the rear or bottom portion of the tool adapter is provided with a pilot 148 and a cooperating shoulder 149 that serves to position the entire tool adapter about a selected cavity 16. To radially adjust the tool adapter 138 there is provided a radial adjustment screw 150. As with tool shown in FIGS. 7 and 8, the manual quick-change OD tool 42 of FIGS. 9 and 10 is provided with a Kennametal "KM" clamping unit indicated generally by the numeral 154. This clamping unit 154 serves to retain a conventional cutting unit 156 such as the "KM" cutting unit produced by Kennametal Inc. of Latrobe, Pa. In conventional fashion, a torque screw 154a is cooperative with the clamping unit 154 for securing the clamping unit within the tool adapter 138. Here again, it is important to appreciate that the manual quick-change OD tool 42 disclosed in FIGS. 9 and 10 is designed such that it can be mounted to any one of the work stations around the turret face 14.

Figure 13:
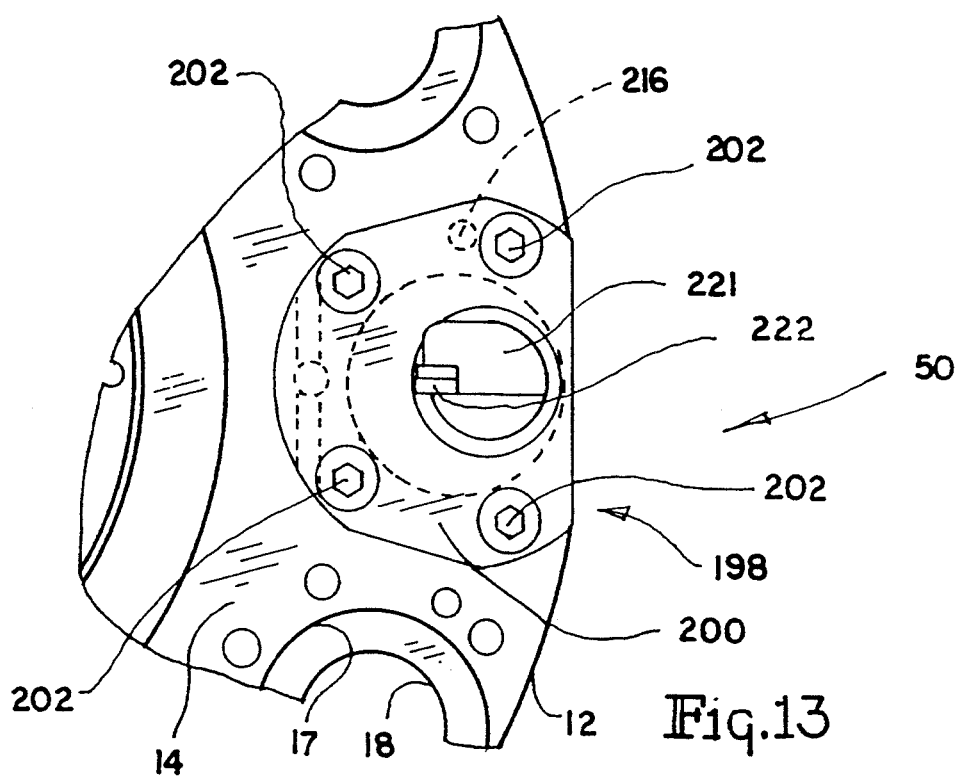
FIG. 13 is a fragmentary front elevational view of a semi or fully automatic quick-change ID tool mounted on the turret disk of the present invention.
Figure 14:
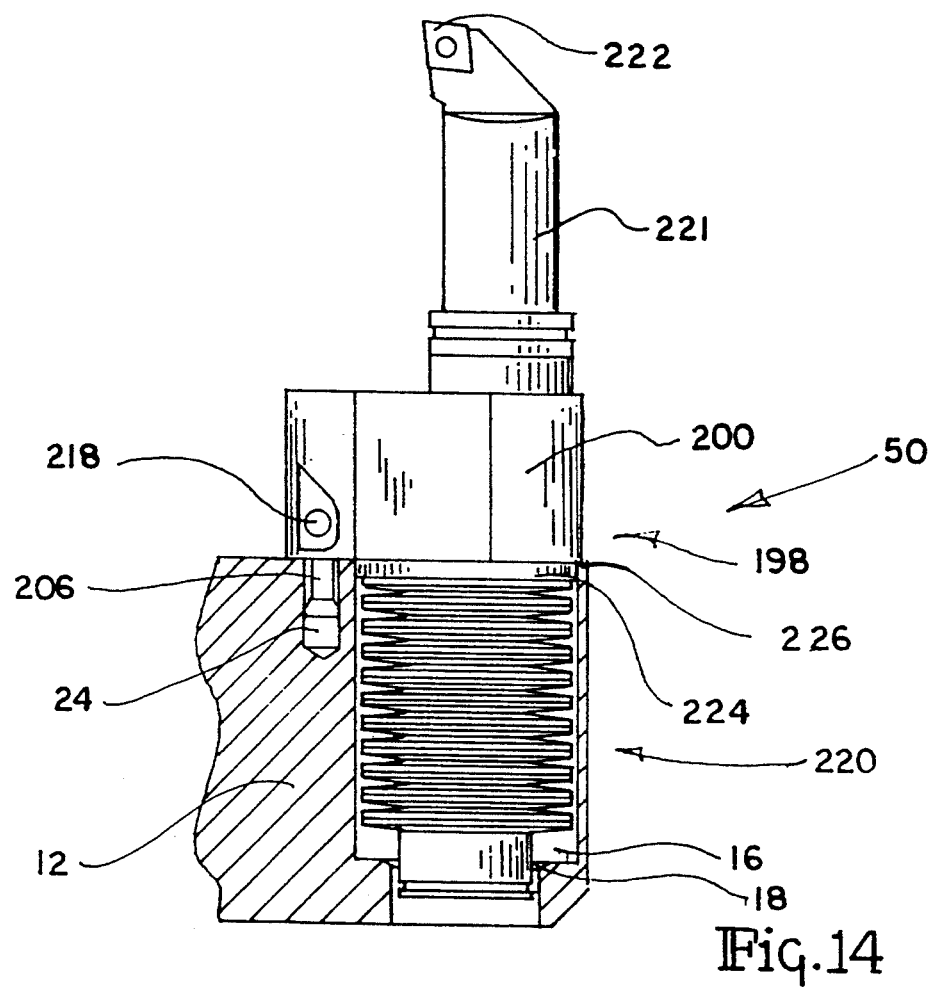
FIG. 14 is a fragmentary transverse sectional view through the turret disk showing the semi or fully automatic quick-change ID tool of FIG. 12 mounted within the turret disk.

In FIGS. 13 and 14, there is shown a semi or fully automatic quick-change ID tool that is indicated generally by the numeral 50. The basic difference between the semi or fully automatic quick-change tool 50 and the manual quick-change tools 40 and 42 just described is that the semi or fully automatic tools generally include a spring pack or a like mechanical device that maintains the tool in a locked state and which is usually actuated to release a tool in place by an external mechanical device. But in any event, the semi or fully automatic quick-change ID tool 50 shown in FIGS. 13 and 14 includes a tool adapter structure 198 that includes a housing 200 and a series of four cap screws 202. Tool adapter 198 includes a locator pin 204 and an internal coolant port 216 as well as a radial adjustment screw 218. To secure a tool such as a Kennametal "KM" boring bar 221 within the tool adapter 198, there is provided a securing structure such as a Kennametal "KM" spring pack clamping unit indicated generally by the numeral 220. Again, details of the Kennametal "KM" spring pack clamping unit are not dealt with herein in detail because such is a commercially available item that can be purchased from Kennametal Inc. of Latrobe, Pa. But referring back to the boring bar 221 the same includes a cutting insert 222 formed about the remote end of the boring bar 221. A pilot 224 and an adjacent abutting shoulder 226 serve to position the tool adapter 198 about any respective mounting station formed on the turret face 14.

Turning to FIGS. 11 and 12, the semi or fully automatic quick-change OD tool is shown therein and indicated generally by the numeral 52. Tool 52 may be mounted to any work station or cavity 16. In like fashion, tool 52 includes a tool adapter 228 that is designed to receive and hold a particular tool. Tool adapter 228 includes a housing 230, a series of four cap screws 232, a rear locating pin 234, and an internal coolant port 236, and a radial adjustment screw 238. As was the case with respect to the tool shown in FIGS. 13 and 14, tool adapter 228 is provided with a "KM" spring pack clamping unit indicated generally by the numeral 240 for receiving and holding a cutting unit 242. To appropriately position tool adapter 228 about the turret face 14 there is provided a pilot 244 and an adjacent abutting shoulder 246. Thus, as with the case of all tool adapters described herein before, the tool adapter 228 of the tool disclosed in FIGS. 11 and 12 can be secured to any work station or cavity 16 formed about the turret disk 12.

In FIGS. 15 and 16, there is shown a live or rotating OD tool indicated generally by the numeral 62. Tool 62 is mounted on turret face 14. Tool 62 includes a tool adapter 298 that includes a housing structure 300 having a series of four cap screws 302 extending through the same for connecting the tool adapter 298 to turret disk 12. In this case, because of the size of the particular tool adapter 298, not all cap screws 302 are aligned with the four hole bolt pattern 20 formed around each cavity 16 on the turret face 14. In this particular case, only two of the four cap screws 302 are so aligned. This means that in the case of tool adapter 298 shown in FIGS. 15 and 16, two additional holes must be drilled and tapped in the face of the turret disk 12 at the desired location of the rotating OD tool 62. But in any event, tool adapter 298 includes an internal coolant port 306 that aligns with the coolant port 24 formed on the turret face 14. The rotating OD tool 62 shown in FIGS. 15 and 16 is known in the machine tool industry and includes a standard integral drive and clamping assembly that extends through the tool adapter structure itself. A conventional collet chuck 308 is held by the internal clamping assembly of the tool adapter and the collet chuck 308 is in turn adapted to secure and drive a drill 310. To drive the drill 310, the drive unit 31, shown in FIG. 2, is actuated after the rotating OD tool 62 and the turret disk 12 have been appropriately indexed such that the tool 62 aligns with the drive shaft 33 extending from the drive unit 31. It is noted that the through cavities 16 are completely open from front to back and this permits the drive shaft 33 of the drive unit 31 to be extended into driving engagement with the integral drive shaft (not shown) that is housed internally within the tool adapter structure 298.

Finally, turning to FIGS. 17 and 18, another live tool is shown therein and this live tool is a rotating ID tool and is indicated generally by the numeral 60. Rotating ID tool 60 includes a tool adapter 248 that includes a housing 250, four cap screws 252, a locator pin 254, an internal coolant port 256, a pilot 258, and an adjacent abutting shoulder 259. Like the rotating OD tool 62 of FIGS. 15 and 16, the rotating ID tool 60 includes an integral drive shaft and spring pack assembly that serves the dual function of both driving a tool element and securing the tool at least indirectly within the tool adapter 248. In this case, tool adapter 248 is designed to hold a collet chuck indicated by the numeral 262 which is in turn adapted to hold a drill 264. Again, in this case, drill 264 can be driven by indexing the turret to where the tool adapter 248 and its associated work station aligns with drive shaft 33 extending from the drive unit 31. The drive shaft 33 is extended in conventional fashion to where it couples through a key-type arrangement with the input of the drive shaft integrally formed or disposed within the tool adapter 248. Thereafter, the drive unit 31 is actuated causing the drive tool or drill 264 to be rotatively driven.

In this case, the four cap screws 252 align with the four bolt hole pattern formed on the base of the turret disk 12. Consequently, in the case of rotating ID tool 60, the same can be placed at any work station about the turret face 14. It should be pointed out that because of size, there may be cases when the two live tools, in this case tools 60 and 62, cannot be placed directly side by side but would have to be placed every other station.

Now referring back to FIG. 1, it is seen therein where the turret disk is designed such that it can receive all eight tools 30, 32, 40, 42, 50, 52, 60 and 62, just described. Except for placing the two live tools 60 and 62 side by side, all tools can be placed at any location on the turret disk 12.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A universal turret system for accommodating a full range of multi-class tools including conventional manual tools, manual quick-change tools, semi or fully automatic tools, and motivated or driven tools, the universal turret system comprising:

(a) a turret disk having front tool mounting face;
    (b) a series of through cavities circumferentially spaced about the turret mounting face of the turret disk with each through cavity extending completely through the turret disk and having front and rear openings;
    (c) a like hole mounting pattern formed around each of the cavities;
    (d) a coolant exhaust port formed adjacent each cavity and disposed in the same location relative to the hole mounting pattern formed around the respective cavities;
    (e) a series of at least four distinct and different tools adapted to be mounted adjacent each cavity of the turret disk, the tools including at least one conventional manual tool having a first tool holder and a cutting tool mounted on the first tool holder, a manual quick-change tool including a second tool holder and a cutting tool mounted on the second tool holder, a semi or fully automatic tool having a third tool holder and a cutting tool mounted on the third tool holder and having associated therewith biasing means for locking the third tool holder in place and for assisting in the release of the third tool holder and a rotatively driven tool having an integral drive assembly and a tool clamping assembly;
    (f) a series of at least four different tool adapters with at least three of the tool adapters having a bolt hole mounting pattern identical to that of the turret face each that at least three tool adapters may be mounted within any cavity formed on the turret face;
    (g) one tool adapter including means for receiving the conventional manual tool, a second tool adapter having means for receiving the manual quick-change tool, a third tool adapter having means for receiving a semi or fully automatic tool, and a fourth tool adapter including means for receiving and driving the driven tool; and
    (h) wherein the four multi-class tools can be mounted at any tool station about the turret face resulting in the universal turret having the capability of accommodating any and all of the multi-class tools.

2. The universal turret disk system of claim 1 wherein the tool adapters forming a part of the system are capable of receiving both ID and OD tools.

3. The universal turret disk system of claim 1 including a live tool drive associated with the turret system and including means for engaging any live tool within any through cavity of the turret disk and driving the same.

4. The universal turret disk system of claim 1 including a semi or fully automatic quick-change tool actuator for engaging a semi or fully automatic quick-change tool located in any cavity of the turret disk and unlocking the semi or fully automatic quick-change tool from its associated tool adapter.

5. The universal turret disk system of claim 1 wherein each tool adapter of the system includes a pilot for appropriately positioning the tool adapter about any one of the through cavities.

6. The universal turret disk system of claim 5 wherein there is provided a locator port about each cavity and wherein each tool adapter includes a locator pin that is adapted to project into a respective locator port so as to precisely align the tool adapter with a respective through cavity.

7. The universal turret disk system of claim 5 wherein respective tool adapters include a rear shoulder disposed adjacent the pilot for abutting against the mounting face of the turret so as to fix the depth that the respective tool adapter projects into a through cavity.

* * * * *